Aug. 7, 1951  D. J. TRICEBOCK  2,563,140
PROTECTIVE CIRCUIT FOR METAL DETECTORS
Filed Dec. 21, 1949
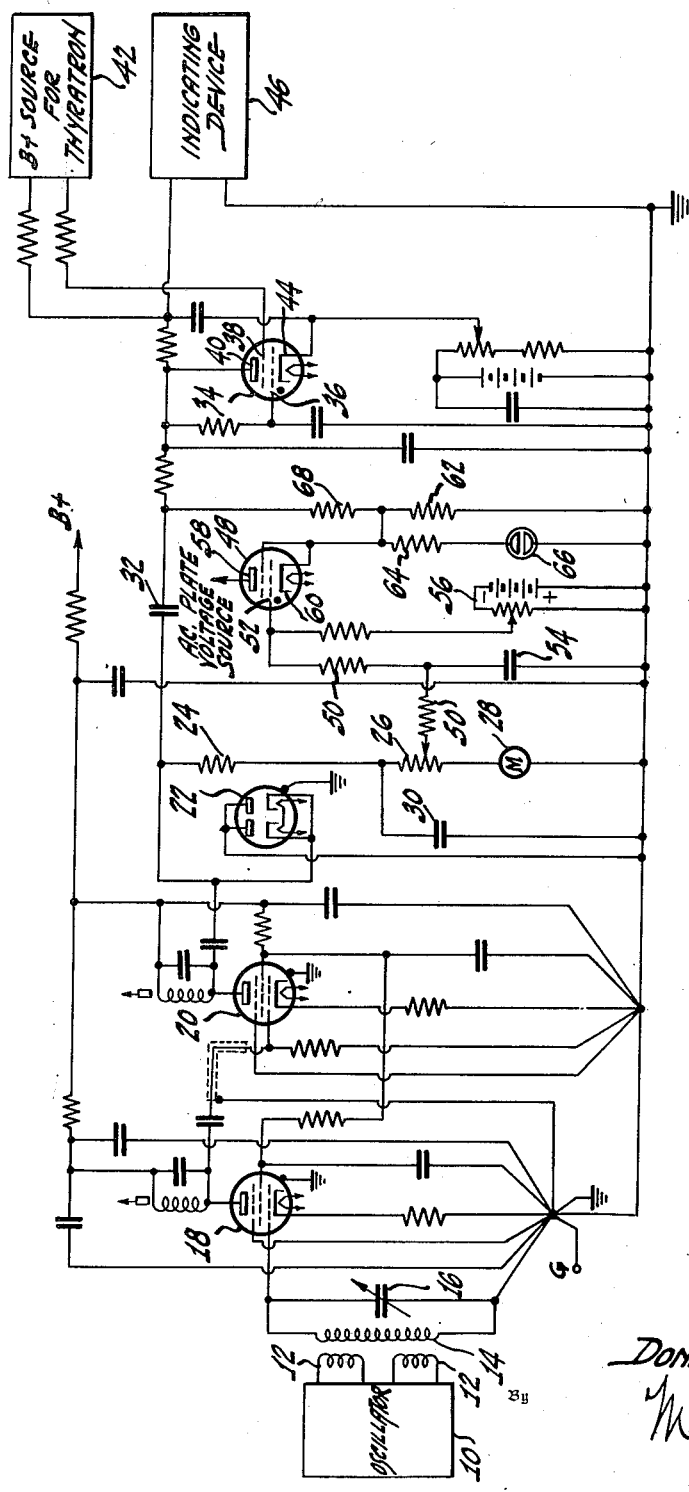
Inventor
DONALD J. TRICEBOCK
By
Morris N. Rabin
Attorney Patented Aug. 7, 1951

2,563,140

UNITED STATES PATENT OFFICE 2,563,140

PROTECTIVE CIRCUIT FOR METAL DETECTORS

Donald J. Tricebock, Erlton, N. J., assignor to Radio Corporation of America, a corporation of Delaware Application December 21, 1949, Serial No. 134,220

3 Claims. (Cl. 175—183)

The present invention relates to inspection apparatus and more particularly to an improvement in metal detecting apparatus.

A metal detector or inspection machine of the general type contemplated has been described and claimed in a copending application, Serial No. 568,045, filed December 13, 1944, by J. H. Reynolds, for "Metal Detectors," now Patent No. 2,513,745, granted July 4, 1950, which is assigned to the same assignee as the present invention. The general principle of operation of devices of this type, insofar as the present invention is concerned, involves the establishment of induced alternating voltages which are normally of equal amplitude and opposite phase. This may be accomplished, for example, by applying alternating currents to a primary coil, to establish a magnetic field, and positioning two opposingly wound and connected secondary coils in the field, which are so spaced that the voltages induced therein are normally equal and opposite. Alternatively, two magnetic fields may be established by a pair of primary coils in symmetrical coupling relation to a single secondary or to two secondary windings connected in opposition. The initial operating condition is normally a null balance.

In order to indicate or detect a metal particle, the material being tested is passed between the primary and secondary coils by any convenient means, usually a traveling dielectric conveyor belt. It is well known that the magnetic field around a coil extends a considerable distance and that any conductor or magnetic material brought into this field will distort it. Distortion may be due to the magnetic permeability of the metal or due to the magnetic field produced by currents induced in the object if it is conductive. Consequently, the initial balance, which is critical, will be upset by any object having electrical properties of permeability or conductivity which is placed in the field of the device, even at a considerable distance from the device.

In commercial use, a conveyor belt, carrying the product to be inspected, passes through the balanced field set up by the field coils. If some of the product contains metal, there is a quick change in the amplitude of the null voltage in the detector coil, as the product is brought into the field by the conveyor belt. As the product passes out of the field the null voltage returns to its original condition. Thus the signal which indicates the presence of metal appears as a low frequency modulation of an alternating current voltage. Although every precaution is taken to provide stable equipment, there is always present in metal detectors a drift about the null or balance point of the inductance bridge constituted by the field coils and the detection coil. The causes of the drift are usually due to ambient temperature variations and ageing or changes in electrical components. The amplitude of the unbalance voltages caused by drift is usually many times greater than the unbalance voltage caused by the smallest metal particle sought to be detected. However, in view of the characteristics of the signal, due to metal passing through the detector field, by using a conventional demodulation circuit the signal due to metal is readily isolated within a certain range of drift from the null point.

Beyond this range, the bridge of the metal detector is so unbalanced that any effects caused by metal passing through the metal detector field are masked. To indicate this condition residual balance voltages are rectified and applied to a meter. The amplitude of the meter signal is a measure of the deviation from balance and when this exceeds a certain predetermined amount the metal detector bridge must be rebalanced.

This system requires continuous periodic checking and besides constituting a nuisance, there is always the danger that in the intervals between checks, the metal detector bridge may drift to such an unbalance as to render the metal detector insensitive to the passage of metal therethrough with a consequent passing of a defective product.

It is therefore an object of my present invention to provide an improved metal detector which automatically indicates drift of the metal detector bridge beyond a predetermined unbalance point.

It is a further object of my invention to provide an improved metal detector which automatically rejects all product when the metal detector bridge has drifted beyond a predetermined unbalance point.

These and further objects of my invention are achieved by providing a metal detector in which a portion of the rectified residual null balance voltage is continuously impressed on the control grid of a gas tube. The gas tube is biased to be nonconducting until the voltage applied to its grid exceeds a value predetermined in accordance with the allowable balance drift. A resistor and glow tube are in series with the cathode of the gas tube. The cathode of the gas tube is also resistance coupled to the control grid of the reject thyratron of the metal detector. In the event of a drift of the metal detector bridge beyond the predetermined point, the gas tube is fired, the glow tube is ignited and the reject mechanism of the metal detector is also made to function.

The novel features of my invention as well as the invention itself, both as to its organization and method of operation, will best be understood from the following description, when read in connection with the accompanying drawing which is a partial schematic and partial circuit diagram of a metal detector including an embodiment of my invention.

Referring to the drawing, an oscillator 10 supplies two field coils 12 with radio frequency oscillations at some convenient frequency. Spaced opposite the field coils 12 and within the field set up by them is a tuned detector coil 14. The two field coils 12 are so wound, positioned and excited that the fields set up by them normally cause substantially equal and opposite voltages at the oscillator frequency to be induced in the detector coil 14 which substantially cancel or nullify each other. This structure is the metal detector bridge. The product to be inspected is conveyed through the space between the field coils and the detector coil and metallic objects in the product distort the field set up by the coil under which they are passing and thus cause unequal voltages to be induced in the detector coil. This causes a deviation from the null voltage in the form of a low frequency modulation on the null voltage and is detected and used to trip an indicating device 46 or rejection mechanism.

The detector coil 14 is tuned to the frequency of the field coils by a condenser 16. The detector coil is coupled to a first tuned amplifier stage 18 which is followed by a second tuned amplifier stage 20. The output of the second tuned amplifier stage 20 is applied to a demodulation circuit including a rectifier 22 and filter circuit consisting of a resistor 24, a potentiometer 26 and a meter 28, all in series with each other, and a shunt condenser 30 connected between the junction of the resistor and potentiometer and ground. The meter 28 is used for the purpose of indicating when a null or balance is reached, indicating this by having its lowest possible reading. Any drift from such a null point may also be determined from a reading of the meter. The demodulated signal is applied through a blocking condenser 32 to the grid 36 of a gas tube 34 such as a thyratron. The grid 36 has additional filter circuits components coupled to it to by pass any voltages which are at the oscillator frequency and which may have passed the demodulation circuit. The condenser 32 serves the purpose of preventing D. C. or any slow drift changes from being applied to the gas tube grid 36 to trigger the tube yet permits lows frequency momentary changes or departures in the null voltage to pass through to be applied to the gas tube grid 36.

This gas tube 34, which is normally nonconducting, has a separate B+ source 42 for its screen 38 and anode 40 in order that it may not be affected by power supply disturbances. A bias voltage is applied to its cathode 44 to establish the amplitude of signal required to trigger the tube. The gas tube is coupled to either an indicating device 46 or automatic reject mechanism, as desired, which is activated when the tube fires.

As thus far described, the metal detector is a typical prior art device. Any momentary departures in the null voltage amplitude caused by the passage of metal through the electromagnetic field of the metal detector is amplified and applied to the thyratron grid. Should the balance of the inductance bridge drift to the extent that the metal detector is insensitive no indication other than that of the meter enables its detection. Unless the meter is read at that time and the unbalance corrected a defective product could be passed.

The embodiment of my invention in combination with the metal detector furnishes an automatic and positive indication of when the drift of the bridge has exceeded the sensitivity limits of the metal detector. It includes a gas tube 48, such as a thyratron, to the grid 52 of which a desired portion of the null balance voltage from the potentiometer 26 and through two series connected isolating resistors 50 is applied. A condenser 54 is joined to the junction of the two isolating resistors 52 to further assist in bypassing or filtering out any momentary or low frequency changes in voltage. In view of the filtering supplied, only the slow voltage changes due to drift can reach the thyratron grid 52. The desired firing voltage can be predetermined by the variable grid bias source 56 presented by the battery and potentiometer coupled to the grid. The gas tube anode 58 is coupled to an alternating current voltage supply so that when a firing voltage is removed from the grid the tube is immediately deionized and ready for another indication of an unbalance.

In series with the thyratron cathode 60 is a cathode load resistor 62. Also connected to the cathode are a limiting resistor 64 and a glow tube 66. The resistor 64 limits the current flowing through the glow tube to a safe value. When the thyratron 48 is rendered conducting the glow tube 66 is ignited and presents a visual signal that the bridge is unbalanced. The signal generated by the thyratron 48 is coupled to the grid of thyratron 34 by means of resistor 68 which is connected between the cathode 60 and the input to the grid of thyratron 34.

In the operation of the improved metal detector, as long as the drift about a null balance is within the limits predetermined by the bias applied to the thyratron grid 52, the thyratron 48 remains inactive and the metal detector will reject any defective product. Should the inductance bridge drift into an unbalanced condition for any reason, the increased voltage caused thereby will fire the thyratron 48, ignite the glow tube 66 and fire the reject gas tube 34. The product will then all be rejected. The operator can then readily determine by observing either the glow tube 66 or the meter 28 that the cause of the rejection is due to the bridge being unbalanced and can then correct this condition. Meanwhile, no product is passed while the detector is insensitive. Any rejected product can readily be reinspected once the bridge is again balanced. Upon rebalancing the bridge, the thyratron 48 is extinguished as well as the glow tube 66 and is ready for another indication.

From the foregoing description it will be readily apparent that I have provided an improved metal detector containing an automatic warning system when the metal detector bridge has drifted to an undesired unbalanced condition. Although I have shown and described but a single embodiment of my present invention, it should be apparent that many changes may be made in the particular embodiment herein disclosed, and that many other embodiments are possible, all within the spirit and scope of my invention. I therefore desire that the foregoing description shall be taken as illustrative and not as limiting.

What is claimed is:

1. In metal detecting apparatus of the type having (1) means for establishing a balanced electromagnet field, (2) detecting coil means wherein voltages induced by said field are substantially balanced, (3) means to amplify and rectify any residual balance voltages induced in said detecting coil means, and (4) means to indicate momentary departures in amplitude of said residual balance voltage caused by the passage of metal through said field, the combination therewith of means to detect a drift from balance of said balanced electromagnetic field comprising resistance means to sample said rectified residual balance voltage, capacitance means to bypass said resistance means for momentary departures in amplitude of said rectified residual balance voltage, a gas tube having at least cathode, anode and grid electrodes, means to couple said resistance means to said grid electrode, means to bias said gas tube to be non-conducting below a predetermined value of said sample voltage whereby a drift in the balance of said balanced electromagnetic field resulting in a value of sample voltage exceeding said predetermined value renders said gas tube conducting, and means coupling said momentary departure indicating means to said gas tube cathode to cause said momentary departure indicating means to become indicating when said gas tube is rendered conducting.

2. In metal detecting apparatus of the type employing (1) a pair of field coils for establishing a balanced electromagnetic field, (2) an associated detector coil wherein voltages induced by said field are substantially balanced, (3) means to amplify and rectify residual balance voltages induced in said detector coil, and (4) means to indicate momentary departures in amplitude of said residual balance voltage caused by the passage of metal through said field, the combination therewith of means to detect a drift from balance of said balanced electromagnetic field comprising resistance means to sample said rectified residual balance voltage, capacitance means to bypass said resistance means for momentary departures in amplitude of said rectified residual balance voltage, a gas tube having at least cathode, anode and grid electrodes, means to couple said resistance means to said grid electrode, means to bias said gas tube to be non-conducting below a predetermined value of said sample voltage whereby a drift in the balance of said balanced electromagnetic field resulting in a value of sample voltage exceeding said predetermined value renders said gas tube conducting, means coupled to said gas tube cathode to indicate when said gas tube is rendered conducting and resistance means coupling said momentary departure indicating means with said gas tube cathode to cause said momentary departure indicating means to become indicating when said gas tube is rendered conducting.

3. In metal detecting apparatus of the type employing (1) a pair of field coils for establishing a balanced electromagnetic field, (2) an associated detector coil wherein voltages induced by said field are substantially balanced, (3) means to amplify and to rectify residual balance voltages induced in said detector coil, and (4) means to indicate momentary departures in amplitude of said residual balance voltage caused by the passage of metal through said field, said latter named means including a first gas tube having a control grid electrode capacitively coupled to said means to rectify, the combination therewith of apparatus to detect a drift from balance of said electromagnetic field comprising a second gas tube having at least anode, cathode and control grid electrodes, first resistance means to couple a sample of said rectified voltage to said control grid electrode, a transient bypass condenser coupled to said resistance means, means to bias said gas tube to be non-conducting below a predetermined value of said sample voltage, a resistor, a glow discharge tube connected in series with said resistor, said first resistor and glow discharge tube being connected in series with said second gas tube cathode, second resistance means connecting said second gas tube cathode with said first gas tube control grid whereby a drift from a predetermined balance of said electromagnetic field causes said second gas tube to fire, said glow tube to ignite and said first gas tube to fire.

DONALD J. TRICEBOCK.

REFERENCES CITED

The following references are of record in the file of this patent:

UNITED STATES PATENTS

| Number | Name | Date |
| --- | --- | --- |
| 2,489,920 | Michel | Nov. 29, 1949 |
| 2,513,745 | Reynolds | July 4, 1950 |